Nov. 21, 1950

H. S. SCOTT 2,531,000

ERYTHEMAL METER

Filed Dec. 24, 1947

2 Sheets-Sheet 1

Wavelength (Angstroms)

Inventor:
Hoyt S. Scott,
by Vernet C. Kauffman
His Attorney.

Nov. 21, 1950 — H. S. SCOTT — 2,531,000
ERYTHEMAL METER
Filed Dec. 24, 1947 — 2 Sheets—Sheet 2

Inventor:
Hoyt S. Scott,
by Vernet C. Kauffman
His Attorney.

Patented Nov. 21, 1950

2,531,000

UNITED STATES PATENT OFFICE 2,531,000

ERYTHEMAL METER

Hoyt S. Scott, Cleveland, Ohio, assignor to General Electric Company, a corporation of New York Application December 24, 1947, Serial No. 793,611

5 Claims. (Cl. 250—83)

My invention relates to portable meters for measuring radiant energy.

The need for a compact, rugged and portable meter, not employing batteries, for measuring the ultra-violet energy which causes reddening of the human skin, that is, radiant energy of from 2800 to 3200 A. wave length, the erythemal spectral region, has long existed but because of the non-selective characteristics of light sensitive cells and the relative insensitivity of such cells to such radiation no satisfactory meter of this type is available. Radiation in the erythemal region, whether produced by the sun or by artificial sources, is usually mixed with radiation of other wave lengths, such as visible light, infrared rays, near ultra-violet radiation and radiation shorter than 2800 A. wave length. Light sensitive cells of the blocking or barrier layer type, which are compact and rugged, are sensitive to much of this radiation so that they cannot be used satisfactorily by direct exposure to such mixed radiations to measure only the radiation in the erythemal spectral region.

The principal object of my invention is to provide a meter comprising cells of the blocking layer type for measuring radiant energy in the erythemal spectral region of 2800 to 3200 A. wavelength, when present either alone or mixed with radiant energy of other wavelengths.

Figure 1:
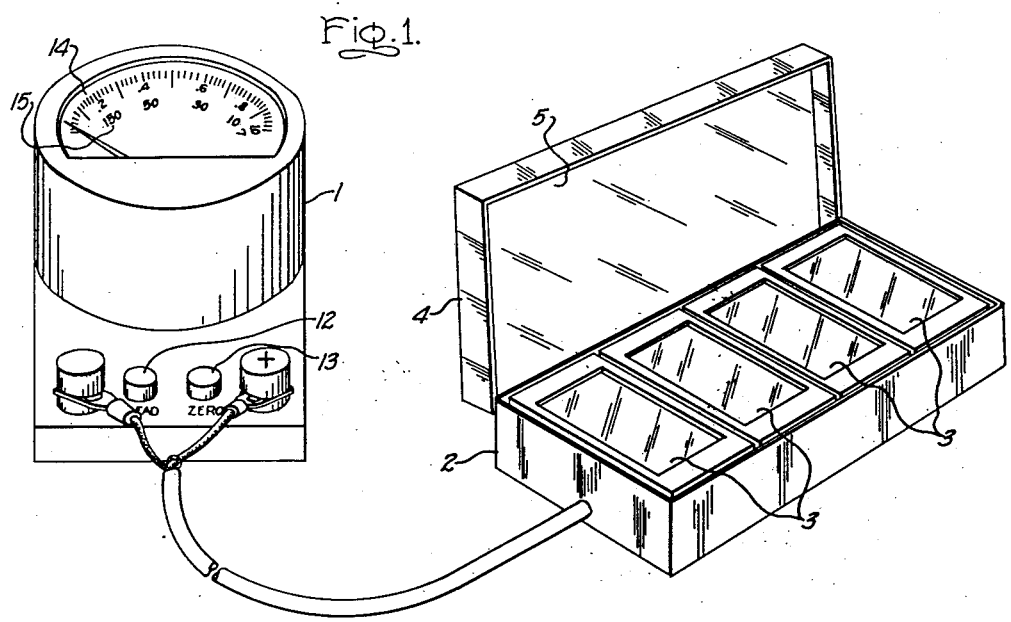
Figure 2:
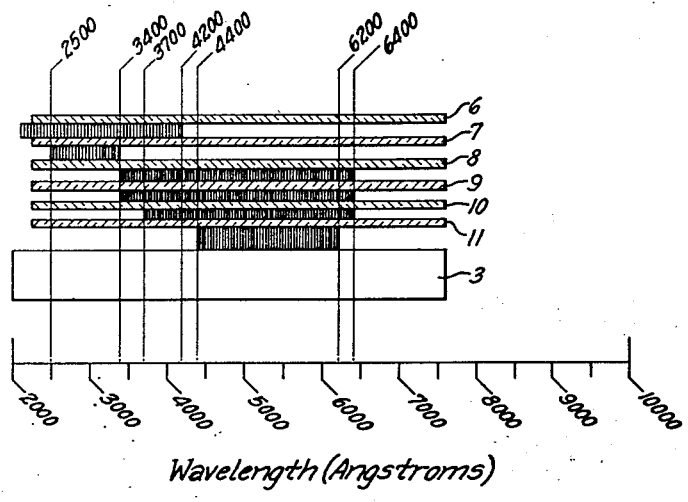
Figure 3:
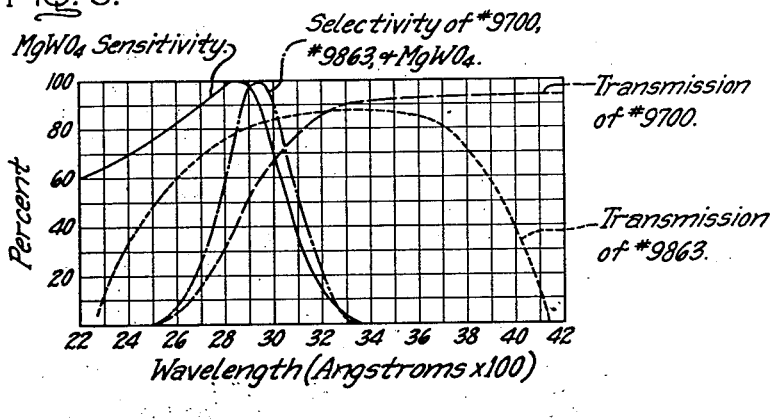
Figure 4:
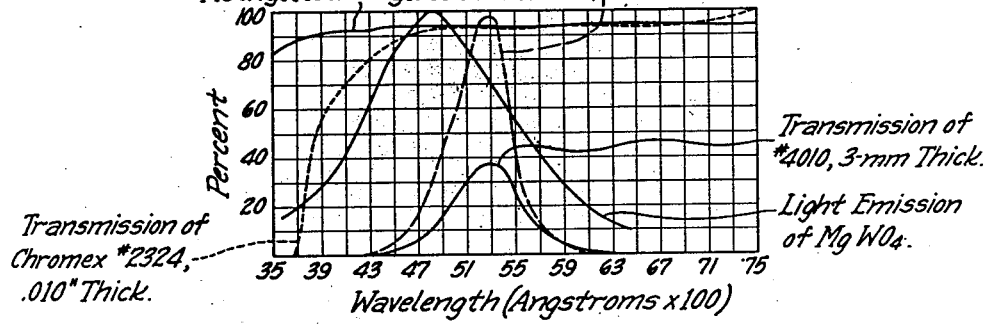
Figure 5:
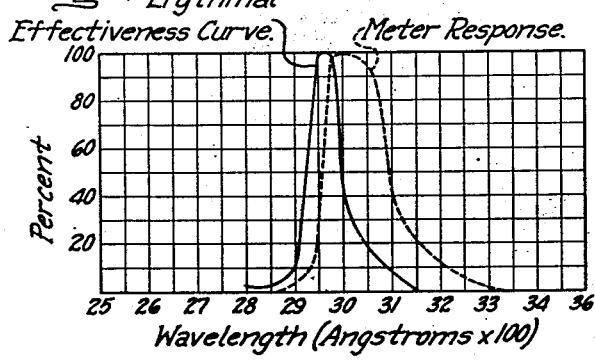
Figure 6:
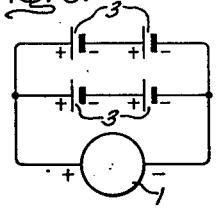

Further objects and advantages of the invention will appear from the following description and from the drawing in which Fig. 1 is a perspective view of a meter embodying my invention; Fig. 2 is a diagrammatic showing, of the system of radiation filters and a light sensitive cell used in the light meter of Fig. 1; Fig. 3 is a chart showing the characteristics of a group of filters used in the meter; Fig. 4 is another chart showing the characteristics of another group of filters; Fig. 5 is a chart showing the erythemal curve; and Fig. 6 is a wiring diagram of the meter of Figs. 1 and 2.

Referring to Fig. 1 of the drawing the light meter comprises a current measuring device 1, such as a microammeter, and rectangular casing 2 containing four light sensitive cells 3 of the barrier or blocking layer type. A cover 4 having a top 5 including a number of filters, for absorbing radiant energy of various wavelengths, as described below, is provided for the casing 4. The cells 3 are electrically connected together in a series parallel circuit across the terminals of the microammeter 1, as shown in Fig. 6, to obtain the optimum energy transfer for measurement by the microammeter. The latter is calibrated so as to be readable directly in E-vitons per square foot, an E-viton being defined as such an amount of radiant flux as will have the same capacity to produce erythema (temporary reddening) of the untanned human skin as 10 microwatts of radiant energy at 2967 A. wavelength.

The light sensitive cells 3 are of a type commercially available and are responsive to radiant energy having wavelengths between about 2800 and 8000 A. with their peak response in a band of the visible spectrum between about 4000 to 6000 A. Accordingly, the top 5 of cover 4 also includes a phosphor described hereinafter for converting or transforming the radiations of between 2800 to 3200 A. wavelength to be measured to radiation of between 4000 to 6000 A. wavelength to which the cells 3 are most responsive.

The first filter 6 of the system in the top 5 of cover 4 is known commercially as red purple Corning #9863 and is available under this designation from the Corning Glass Works, Corning, New York. It is a glass filter about 3 mm. thick, is polished on both sides, and its transmission curve is shown in Fig. 3 of the drawing. As shown in this figure and in Fig. 2, filter 6 transmits ultra-violet radiation and absorbs the radiation about 4100 A. Its peak transmission is between 2900 and 2700 A. and it transmits between 75 and 85 per cent of the incident radiation in the erythemal region 2800 to 3200 A. It also transmits a slight amount of infrared radiation which must be absorbed by other filters.

The second filter 7 is Corex D Corning #9700 which absorbs radiation below 2500 A. transmitted by filter 6 and transmits an extremely small amount at 2537 A. and approximately 45% to 90% of the incident radiation between 2800 and 3200 A. It also transmits the small amount of infrared mentioned above. This filter 8 is also a glass filter, about 3 mm. thick, is polished on both sides, and is commercially available from the Corning Glass Works, Corning, New York.

The two filters 6 and 7, which I designate as the pre-filter group, thus cut-off or absorb substantially all the incident radiation above 4200 A. and below about 2500 A. and transmit energy between the limits of 2500 A. and 4100 A. The greater part of the energy between 2800 A. and 3200 A. is transmitted thereby and also a small amount as low as 2500 A. and a small amount of infrared.

The phosphor mentioned above also blocks out visible light from the source if any gets through the filters 6 and 7, as may happen with high intensity sources. The phosphor converts the erythemal radiation between 2800 to 3200 Å. to visible light in proportion to the amount of erythemal radiation incident thereon. It is indicated at 8 in Fig. 2 of the drawing and consists of fluorescent magnesium tungstate (MgWO$_4$) powder applied as a coating by known method, such as by using a suspension of the powder in a suitable binder, such as butylacetate to the surface of the glass filter 7 facing away from the light source and toward photoelectric cell. I call this phosphor coating the "exciter" since it emits visible light which excites the light sensitive surface of the photoelectric cell and causes it to generate an electric current. As shown by the sensitivity curve of the exciter in Fig. 3, the exciter 8 is most sensitive or responsive to radiations of about 2850 Å. It acts as a filter to some extent for radiation on each side of 2850 Å. The exciter 8 is not responsive to radiations above 3400 Å. transmitted by the filters 6 and 7 and, while its sensitivity to radiations of 2900 Å. is greater than is theoretically desirable, this makes little difference practically since the usual sources of erythemal radiations, such as the sun and sunlamps, emit but relatively small amounts of energy at 2900 Å.

Also shown in Fig. 3 is the relative selectivity curve of the pre-filter group 6 and 7 and the exciter 8, which is in effect the product of the transmission curves of the two filters and the sensitivity curve of the exciter and represents the effective energy incident on the exciter.

Fig. 4 of the drawing shows the characteristics of a group of filters I designate as the post-filter group since it filters the energy transmitted and emitted by the exciter 8. These filters are necessary for absorbing the small amounts of infrared and energy below 3700 Å. transmitted by the filters 6 and 7 and the exciter 8, because the cells 3 are responsive to energy in these regions.

This chart also shows the light emission curve of the exciter 8 which reaches a maximum at a point between 4700 and 5100 Å.

The first element 9 (Figs. 2 and 4) of the post-filter group consists of a thin film of methyl methacrylate which is applied as a protective film over the phosphor coating constituting the exciter 8 and which transmits the visible light emitted by the exciter 8. It also transmits the undesirable infrared radiations and the ultraviolet energy below 2800 Å.

The second filter 10 (Figs. 2 and 4) in the post-filter group is a plastic filter known as Chromex #2324 and is available under this designation from Dufax-Chromes Limited of London, England. This filter absorbs energy below 3700 Å. but transmits most of the visible light emitted by the exciter 8. It also transmits infrared radiations.

The third filter 11 (Figs. 2 and 4) of the post-filter group is a glass filter approximately 3 mm. thick, polished on both sides and known commercially as Corning #4010 sextant green. This transmits the visible light in the limited range of from 4300 to 6300 Å. and absorbs the small amount of residual energy in the infrared which would energize the cell slightly. It also absorbs most of the long wavelength ultra-violet, but if used alone without the filter 10 I have observed that it transmits enough of such long wavelength ultra-violet to affect the accuracy of the erythemal meter. Thus, both filters 10 and 11 are necessary for the best results. The maximum transmission of filter 11 is at 5300 Å. which is within the band at which the cells 3 are most sensitive, that is, between 4000 Å. and 6000 Å. It is this energy only which impinges on the cells 3 and its curve is shown in Fig. 4.

The post-filter group thus absorbs all radiation outside the spectral band to which the cells show their maximum response. I call the radiation outside said band "stray" radiation in the claims and intend to designate thereby the radiation outside the band transmitted by the pre-filter group and the exciter and also that generated by the exciter.

The cells 3 are of a well-known type and are made up of an iron support strip coated on its exposed surface with a layer of selenium and a thin, light pervious coating of silver over the selenium coating. A thin, light transmitting lacquer film is applied to the cell to protect the selenium coating from weather and moisture. Such cells are commercially available and their characteristics are well known.

The series parallel circuit including the cells 3 and the microammeter 1 is shown in Fig. 6 of the drawing. This circuit gives the maximum energy transfer from the cells 3 to the microammeter. The microammeter is provided with two push buttons 12 and 13, one of which, 12, connects the microammeter across the cells when it is pushed downward and the other of which, 13, brings the pointer 14 quickly to zero after a reading has been taken. The microammeter is an extremely sensitive one, though rugged enough for transportation and handling and accurately measures current of from one fifty millionth of an ampere up to one microampere. Microammeters of this type are available from the Hickok Electrical Instrument Company of Cleveland, Ohio.

In order that the erythemal meter may be used for the purpose contemplated its responses should correspond closely to the erythemal effectiveness curve. As pointed out above, the erythemal band is between 2800 Å. and 3200 Å. and is at its maximum effectiveness at 2967 Å. The erythemal curve is shown in Fig. 5 and is in accordance with the curve published in "Applications of Germicidal, Erythemal, and Infrared Energy" by Luckiesch, Fig. 28, page 71, published by the D. Van Nostrand Company. The response of the erythemal meter described above is in close conformity to this published curve and its maximum response is at approximately 3000 Å., as shown by the second curve of Fig. 5. Thus, the meter may be read directly to ascertain the erythemal component of the radiant flux in solaria. Solaria energy generators have components in addition to erythemal ultra-violet, such as visible light, infrared and near ultra-violet. The erythemal meter does not register any of this energy outside the erythemal region.

The safe exposure time of the human skin to the erythemal radiation, measured in minutes required for minimum perceptible erythema, may be indicated on the dial of the microammeter as shown at 15 in Fig. 1 of the drawing.

What I claim as new and desire to secure by Letters Patent of the United States is:

1. A meter for measuring erythemal radiation comprising a light sensitive cell having its maximum response in a band of the visible spectral region and being responsive also to radiation outside said band, a current measuring instrument connected to said cell and a cover over the light sensitive surface of the cell comprising means for absorbing substantially all radiation other than erythemal radiation, means for converting the transmitted erythemal radiation into radiation of longer wave length including visible light in the spectral band in which the cell has its maximum response and means including a Corning #4010 filter between said second named means and said cell for absorbing all stray radiation, including infrared radiation, whereby the meter response corresponds closely to the erythemal effectiveness curve.

2. A meter for measuring erythemal radiation comprising a light sensitive cell having its maximum response in a band of the visible spectral region and being responsive also to radiation outside said band, a current measuring instrument connected to said cell and a cover over the light sensitive surface of the cell comprising a red purple Corning #9863 first filter and a Corex D Corning #9700 second filter for transmitting the erythemal radiation and absorbing substantially all other radiation, a coating of fluorescent magnesium tungstate powder on the surface of said #9700 filter facing away from said first filter, a thin film of methyl methacrylate covering said powder, a Chromex #2324 filter in the path of light emitted by said powder, a Corning #4010 sextant green filter mounted in the path of the light transmitted by said Chromex filter and a light sensitive cell having its maximum response in the spectral band of the light transmitted by said Corning #4010 filter whereby the meter response corresponds closely to the erythemal effectiveness curve.

3. A meter for measuring erythemal radiation comprising a plurality of light sensitive cells of the barrier layer type having their maximum response in a band of the visible spectrum and being responsive also to radiation outside said band and a current measuring instrument for said cells, the latter being connected in a series parallel circuit across said instrument and a cover over the light sensitive surface of the cells comprising means for absorbing substantially all radiation other than erythemal radiation, means for converting the transmitted erythemal radiation into radiation of longer wave length including visible light in the spectral band in which the cell has its maximum response and means including a Chromex #2324 filter and a Corning #4010 filter between said second named means and said cell for absorbing all stray radiation, including infrared radiation, whereby the meter response corresponds closely to the erythemal effectiveness curve.

4. A meter for measuring erythemal radiation comprising a plurality of light sensitive cells of the barrier layer type having their maximum response in a band of the visible spectrum and being responsive also to radiation outside said band and a current measuring instrument for said cells, the latter being connected in a series parallel circuit across said instrument which is equipped with a dial calibrated in E-vitons per square foot for direct reading, and a cover over the light sensitive surface of the cells comprising means for absorbing substantially all radiation other than erythemal radiation, a fluorescent powder for converting the transmitted erythemal radiation into radiation of longer wave length including visible light in the spectral band in which the cell has its maximum response and means including a Chromex #2324 filter and a Corning #4010 filter between said powder and said cell for absorbing all stray radiation, including infrared radiation, whereby the meter response corresponds closely to the erythemal effectiveness curve.

5. A meter for measuring erythemal radiation comprising a plurality of light sensitive cells of the barrier layer type having their maximum response in a band of the visible spectrum and being responsive also to radiation outside said band and a current measuring instrument for said cells, the latter being connected in a series parallel circuit across said instrument which is equipped with a dial calibrated in minutes required for minimum perceptible erythema for direct reading, and a cover over the light sensitive surface of the cells comprising means for absorbing substantially all radiation other than erythemal radiation, a fluorescent magnesium tungstate powder for converting the transmitted erythemal radiation into radiation of longer wave length including visible light in the spectral band in which the cell has its maximum response and means consisting of a thin film of methyl methacrylate covering the said powder, a Chromex #2324 filter and a Corning #4010 filter between said powder and said cell for absorbing all stray radiation, including infrared radiation, whereby the meter response corresponds closely to the erythemal effectiveness curve.

HOYT S. SCOTT.

REFERENCES CITED

The following references are of record in the file of this patent:

UNITED STATES PATENTS

| Number | Name | Date |
|---|---|---|
| 2,114,163 | Bird | Apr. 12, 1938 |
| 2,128,110 | Wilson | Aug. 23, 1938 |
| 2,200,853 | Porter et al. | May 14, 1940 |
| 2,349,754 | Porter | May 23, 1944 |

OTHER REFERENCES

Storage Batteries by Vinal, 3rd edition (1940) page 5.